US010646942B2

(12) United States Patent
Charlas

(10) Patent No.: US 10,646,942 B2
(45) Date of Patent: May 12, 2020

(54) BRAZING METHOD FOR ASSEMBLING TWO ELEMENTS VIA AN INTERMETALLIC COMPOUND

(71) Applicant: SAFRAN ELECTRICAL & POWER, Blagnac (FR)

(72) Inventor: Mathieu Charlas, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 233 days.

(21) Appl. No.: 15/555,197

(22) PCT Filed: Mar. 3, 2016

(86) PCT No.: PCT/FR2016/050489
§ 371 (c)(1),
(2) Date: Sep. 1, 2017

(87) PCT Pub. No.: WO2016/139429
PCT Pub. Date: Sep. 9, 2016

(65) Prior Publication Data
US 2018/0050405 A1 Feb. 22, 2018

(30) Foreign Application Priority Data
Mar. 4, 2015 (FR) ...................... 15 51818

(51) Int. Cl.
*B23K 1/00* (2006.01)
*B23K 35/30* (2006.01)
(Continued)

(52) U.S. Cl.
CPC .......... *B23K 1/0008* (2013.01); *B23K 1/0016* (2013.01); *B23K 35/0222* (2013.01);
(Continued)

(58) Field of Classification Search
None
See application file for complete search history.

(56) References Cited

U.S. PATENT DOCUMENTS 6,300,673 B1 * 10/2001 Hoffman ............... H01L 23/057
257/666
7,172,643 B2 * 2/2007 Shohji ................ B23K 35/0244
148/513

(Continued)

FOREIGN PATENT DOCUMENTS

JP 2004-306121 A 11/2004

OTHER PUBLICATIONS

International Search Report as issued in International Patent Application No. PCT/FR2016/050489, dated Jun. 8, 2016.

*Primary Examiner* — Jonathan P Masinick
(74) *Attorney, Agent, or Firm* — Pillsbury Winthrop Shaw Pittman LLP

(57) ABSTRACT

A brazing method for assembling two elements includes selecting two brazing materials that can generate, when they are heated and melted, an intermetallic compound having a melting temperature which is higher than the melting temperature of each of the selected brazing materials taken individually, positioning the two selected brazing materials between the two elements, heating and melting the two selected brazing materials in order to substantially reach the melting temperature of each of the selected brazing materials so as to achieve the precipitation of an intermetallic compound having a melting temperature which is higher than the melting temperature of each of the selected brazing materials taken individually.

9 Claims, 1 Drawing Sheet

(51) Int. Cl.
*B23K 35/26* (2006.01)
*B23K 35/02* (2006.01)
*B23K 35/24* (2006.01)
*F16B 5/08* (2006.01)

(52) U.S. Cl.
CPC .......... *B23K 35/0244* (2013.01); *B23K 35/24* (2013.01); *B23K 35/26* (2013.01); *B23K 35/262* (2013.01); *B23K 35/30* (2013.01); *B23K 35/3013* (2013.01); *F16B 5/08* (2013.01)

(56) References Cited

U.S. PATENT DOCUMENTS

| | | | | |
|---|---|---|---|---|
| 8,002,905 | B2* | 8/2011 | Boger | B23K 35/0244 148/24 |
| 8,075,706 | B2* | 12/2011 | Akazawa | B23K 35/0244 148/23 |
| 2003/0015220 | A1* | 1/2003 | Pennington | B23K 35/38 134/2 |
| 2005/0184304 | A1* | 8/2005 | Gupta | B81C 1/00214 257/98 |
| 2005/0253282 | A1 | 11/2005 | Lu et al. | |
| 2007/0245852 | A1 | 10/2007 | Takaoka et al. | |
| 2011/0315315 | A1 | 12/2011 | Garnier | |
| 2012/0055586 | A1 | 3/2012 | Mcisaac et al. | |
| 2013/0333806 | A1* | 12/2013 | Okada | B23K 35/0244 148/23 |

* cited by examiner

BRAZING METHOD FOR ASSEMBLING TWO ELEMENTS VIA AN INTERMETALLIC COMPOUND

CROSS-REFERENCE TO RELATED APPLICATIONS

This is the U.S. National Stage of PCT/FR2016/050489, filed Mar. 3, 2016, which in turn claims priority to French Patent Application No. 1551818, filed Mar. 4, 2015, the entire contents of all applications are incorporated herein by reference in their entireties.

TECHNICAL FIELD OF THE INVENTION

The invention relates to a brazing method for assembling two elements via an intermetallic compound and is applicable, in a non-limiting manner, to power electronic components used in the aeronautics field. Other applications may be envisaged, for example, in the field of electrical engineering for the assembly of electric motors.

PRIOR ART

The development of aeronautic power electronic solutions is currently opening the way to numerous possibilities for optimising energy consumption on board an aircraft. The power electronics sector has seen the emergence of semiconductor components using so-called "wide gap" materials such as silicon carbide or instead gallium nitride. The components developed from these semiconductor materials also have the advantage of being able to operate at higher temperature than previous generations. Since such components are capable of operating at high temperature, they can be used in areas where the temperature did not until then make it possible to envisage making an electronic operate correctly without a complex and heavy cooling system.

However, although the operation of "wide gap" semiconductors no longer poses a particular problem in high temperature environments, the solutions for assembling these components using these semiconductors still represent a challenge.

As an illustration, in the case of a component (a chip for example) made of silicon carbide of which the desired nominal operating temperature is 300° C., the brazing solution by melting a metal alloy used to assemble the silicon carbide chip on an electronic circuit must have a melting temperature very markedly higher than the optimal operating temperature. This temperature difference makes it possible to obtain optimal operating reliability. Nevertheless, by increasing this melting temperature too much, there is a very high risk of damaging the remainder of the electronic circuit.

It is known to use a diffusion brazing method. In this case, two different alloys are used, one with low melting temperature, the other with higher melting temperature. The idea is then to make the alloy with low melting temperature melt and to wait, in this molten state, for the alloy with higher melting temperature to diffuse little by little through the liquid to "precipitate an intermetallic compound" with very high melting temperature. The main problem with this solution is its long implementation time, which makes it expensive. Another source of difficulty stems from the complexity of managing precipitations of intermetallic compounds. It is indeed difficult to ensure homogeneity of the joint formed. The latter is thus particularly weakened by this heterogeneity.

It is also known to use a brazing method by sintering of metallic powders. In this case, metal powder (generally silver) is intercalated between the component and the substrate on which it has to be attached. This metal powder is next agglomerated under the effect of a pressure of several tens of MPa and at a temperature of around 300° C. It should however be noted that known sintering solutions use silver powder. Yet this metal has a strong tendency towards electro-migration. These electro-migrations lead to electrical contacts between points at different potential and thus breakages of the components. Moreover, these solutions have a high risk of damaging the chips due to the pressurised implementation (from 5 to 40 MPa).

GENERAL DESCRIPTION OF THE INVENTION

The aim of the invention is thus notably to overcome the aforementioned drawbacks. In this context, the invention aims to propose a brazing method for assembling two elements that will be implemented in a high temperature environment. Moreover, the brazing method for assembling two elements is easy to implement, is inexpensive and has a reduced implementation time.

To this end, the invention pertains to a brazing method for assembling two elements, said method comprising the steps of:

selecting two brazing materials that can generate, when they are heated and melted, an intermetallic compound having a melting temperature which is higher than the melting temperature of each of the selected brazing materials taken individually, positioning the two selected brazing materials between the two elements, heating and melting the two selected brazing materials in order to substantially reach the melting temperature of each of the selected brazing materials so as to achieve the precipitation of an intermetallic compound having a melting temperature which is higher than the melting temperature of each of the selected brazing materials taken individually.

In other words, the assembly joint obtained is thus composed of an intermetallic compound (or precipitate), very stable and with very high melting temperature. One advantage of this technology is to allow brazing at a relatively reasonable temperature whereas the joint created is efficient up to the melting temperature of the intermetallic compound which is higher than the nominal operating temperature of the two elements and which is higher than the melting temperature of each of the selected brazing materials taken individually. This operating temperature in the aeronautics field may be of the order of 300° C.

Moreover, a contribution of the present invention is to propose a mixture of two alloys in the liquid-liquid state, unlike known solutions of component assembly associating liquid-metal and thereby playing on the atomic diffusion of the liquid in the metal. In the case of the invention, the mixing is instantaneous. This solution is thus innovative in that it makes it possible to shorten the implementation times.

Apart from the main characteristics that have been mentioned, the brazing method according to the invention may have one or more additional characteristics below, considered individually or according to all technically possible combinations thereof:

Each selected brazing material is an alloy or a pure metal;

One of the two selected brazing materials is an alloy of Au80Sn20 type and the other of the two selected brazing materials is pure tin;

Each selected brazing material is in the form of:
- a strip, or
- a powder mixed with a high viscosity organic material.

The high viscosity organic material plays the role of deoxidising agent;

The powder mixed with a high viscosity organic material is positioned between the two elements using a syringe;

One of the two elements is formed by a substrate and the other of the two elements is formed by an electronic component;

The difference between each of the two melting temperatures of the two selected brazing materials and the melting temperature of the intermetallic compound is higher than 100° C.

One aspect of the invention also relates to a device comprising two elements attached to each other, said two elements being attached to each other via an intermetallic compound obtained via the melting of two brazing materials, said intermetallic compound having a melting temperature which is higher than the melting temperature of each of the two brazing materials.

Other characteristics and advantages of the invention will become clear from the description that is given thereof hereafter, by way of indication and in no way limiting, with reference to the appended figures among which:

For reasons of clarity, only elements useful for understanding the invention have been represented, without respect for scale and in a schematic manner. Moreover, similar elements located in the different figures bear identical references.

FIG. 1 illustrates the steps of the brazing method 100 for assembling two elements in accordance with the invention. In a non-limiting manner, the two elements are formed by a first element of substrate type and a second element of electronic component type, such as an electronic chip.

The brazing method 100 comprises a step 101 of selecting two brazing materials that can generate, when they are heated and melted, an intermetallic compound having a melting temperature which is higher than the melting temperature of each of the selected materials taken individually.

It should be noted that each selected brazing material is an alloy or a pure metal. As a non-limiting example, it is possible to select a first brazing material of pure metal type, for example pure tin, the melting temperature of which is 232° C. Moreover, it is possible to select a second brazing material of alloy type, for example the alloy Au80Sn20, the melting temperature of which is 278° C. After having heated and melted the pure tin and the Au80Sn20 alloy, the intermetallic compound obtained will be an alloy of AuSn type, the melting temperature of which is 419° C.

Figure 1:
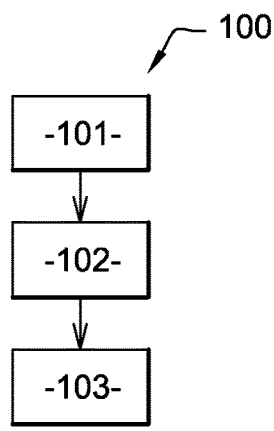
FIG. 1 illustrates a synoptic of the steps of the method in accordance with the invention.
Figure 2:
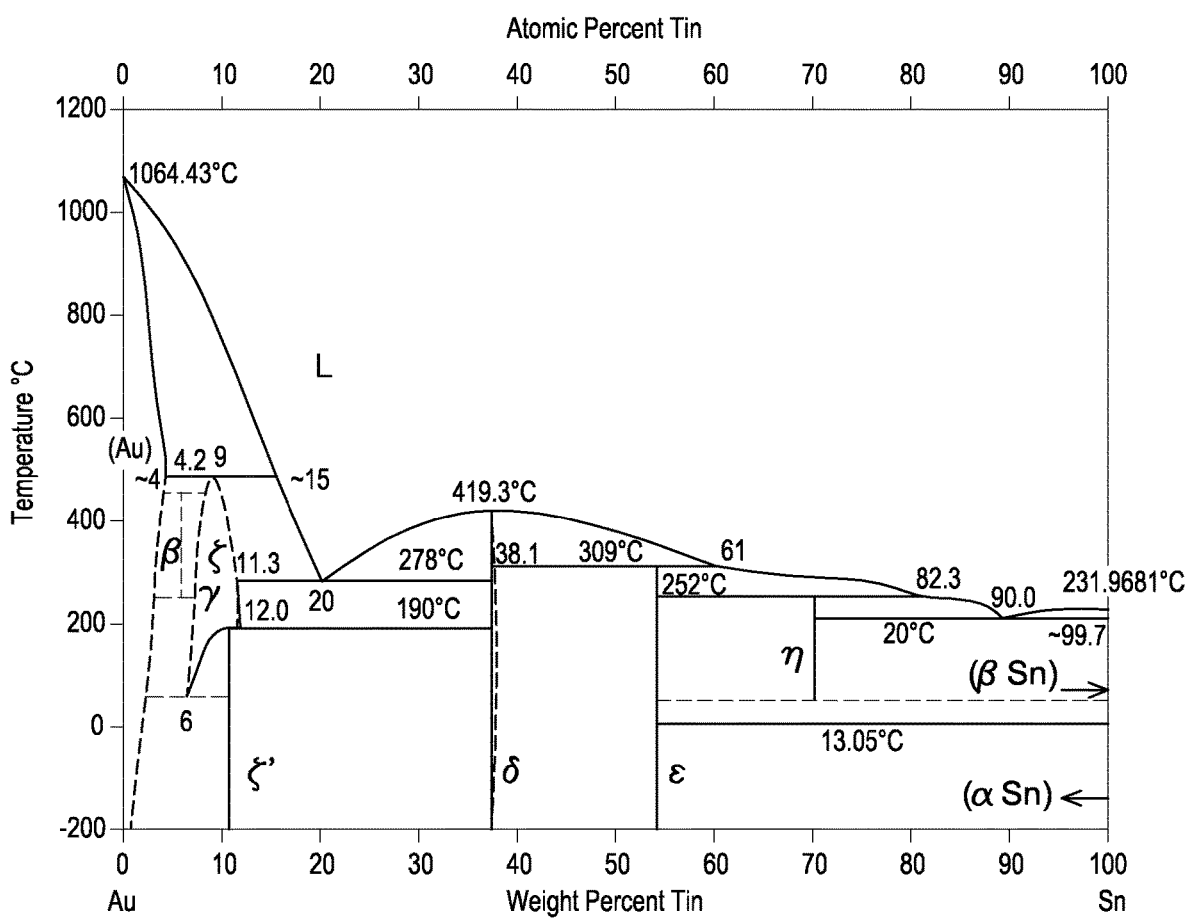
FIG. 2 illustrates a tin and gold binary phase change diagram.

For example, FIG. 2 illustrates a tin-gold binary phase change diagram. As an example, if the two elements attached via the intermetallic compound have to be implemented in an operating environment, such as an aircraft engine, close to 300° C., then an intermetallic compound is required of which the melting temperature is distinctly higher than 300° C. With regard to the tin-gold binary phase change diagram illustrated in FIG. 2, it is advantageous to select the intermetallic compound formed by the alloy AuSn, the melting temperature of which is 419.3° C. By choosing the intermetallic compound AuSn, the melting temperature of which is 419.3° C., the intermetallic compound is formed of an alloy having 62.5% by weight of gold and 37.5% by weight of tin. Thus, in a non-limiting manner, to obtain the intermetallic compound formed of an alloy having 62.5% by weight of gold and 37.5% by weight of tin, it is possible to use:

A first brazing material formed by the alloy Au80Sn20, the melting temperature of which is 278° C. and the weight represents 72% by weight of the intermetallic compound, this alloy Au80Sn20 comprises 20% by weight of tin+80% by weight of gold, and A second brazing material formed by pure tin having a melting temperature of 232° C. and the weight of which represents 28% of the intermetallic compound.

The fact of heating and melting this association makes it possible to obtain an alloy of 62.5% by weight of gold+ 37.5% by weight of tin, i.e. the precise proportion of the intermetallic compound AuSn.

The brazing method 100 further comprises a step of positioning 102 the two selected brazing materials between the two elements.

Each of the two aforementioned brazing materials may be in the form of:
- a preform (also designated strip), or
- a powder mixed in a homogenous manner with a high viscosity organic material (commonly called "brazing cream"), the high viscosity organic material playing the role of deoxidising agent.

For example, when one or the two brazing materials is (are) in the form of powder mixed with a high viscosity organic material, it may be positioned between the two elements using a syringe.

The brazing method 100 also comprises a step 103 consisting in heating and melting the selected brazing materials in order to substantially reach the melting temperature of each of the selected brazing materials so as to achieve the precipitation of an intermetallic compound having a melting temperature which is higher than the melting temperature of each of the selected materials taken individually.

According to the example described, it is thus possible by heating around 309° C. to reach the melting temperature of the two selected brazing materials so as to melt them (in other words to mix them) in order to create a pure intermetallic compound having a melting temperature of 419° C. Thus, the temperature of the brazing method has not exceeded 309° C., which makes it possible to preserve all of the electronic components located on the substrate. All the same, the substrate and the electronic chip could be positioned in an environment of which the nominal operating temperature exceeds 309° C. without for all that risking being detached from each other.

In other words, the present invention consists in a brazing solution making it possible to assemble two elements, thanks to the melting of two metals or alloys of metals, at a temperature enabling the precipitation of a single intermetallic compound, having a melting point higher than the melting temperatures of the starting two metals or metal alloys. In other words, the method 100 according to the invention makes it possible to obtain a brazing joint 100% composed of an intermetallic compound which is very stable over time, unlike the complex metallographic associations that are generally found in brazing alloys.

Figure 3:
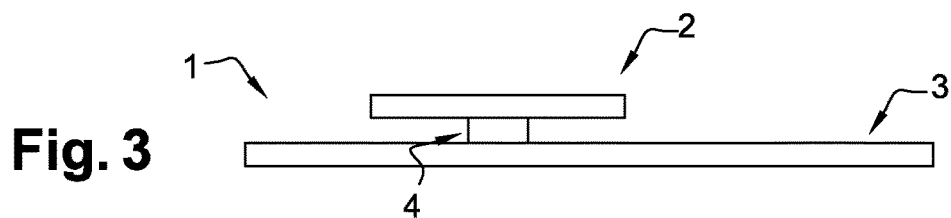
FIG. 3 illustrates in a schematic manner an exemplary embodiment of a device in accordance with the invention.

The invention also pertains to a device 1 in accordance with the invention comprising two elements 2 and 3 attached to each other. FIG. 3 illustrates such a device 1.

A first element is formed by an electronic chip 2 and a second element is formed by a substrate 3, the electronic chip 2 and the substrate 3 being attached to each other via an intermetallic compound 4 obtained via the melting of two brazing materials. The intermetallic compound 4 has a melting temperature which is higher than the melting temperature of each of the two amalgamated brazing materials.

The invention claimed is:

1. A brazing method for assembling two elements, said method comprising:

selecting two brazing materials that can generate, when the two brazing materials are heated and melted, an intermetallic compound having a melting temperature which is higher than the melting temperature of each of the two selected brazing materials taken individually, positioning the two selected brazing materials between the two elements, heating and melting the two selected brazing materials to substantially reach the melting temperature of each of the two selected brazing materials so as to achieve the precipitation of an intermetallic compound having a melting temperature which is higher than the melting temperature of each of the two selected brazing materials taken individually.

2. The brazing method according to claim 1, wherein each of the two selected brazing materials is an alloy or a pure metal.

3. The brazing method according to claim 1, wherein one of the two selected brazing materials is Au80Sn20 alloy and the other of the two selected brazing materials is pure tin.

4. The brazing method according to claim 1, wherein each of the two selected brazing materials is in the form of:
a strip, or
a powder mixed with an organic material.

5. The brazing method according to claim 4, wherein the organic material plays the role of deoxidising agent.

6. The brazing method according to claim 4, wherein the powder mixed with the organic material is positioned between the two elements using a syringe.

7. The brazing method according to claim 1, wherein one of the two elements is formed by a substrate and the other of the two elements is formed by an electronic component.

8. The brazing method according to claim 1, wherein the difference between each of the two melting temperatures of the two selected brazing materials and the melting temperature of the intermetallic compound is higher than 100° C.

9. A device comprising two elements attached to each other, said two elements being attached to each other via an intermetallic compound obtained via the melting of two brazing materials, said intermetallic compound having a melting temperature which is higher than the melting temperature of each of the two brazing materials.

* * * * *